(12) United States Patent
Chen et al.

(10) Patent No.: US 12,603,207 B2
(45) Date of Patent: Apr. 14, 2026

(54) OPTICAL DRIVING MECHANISM

(71) Applicant: TDK TAIWAN CORP., Taoyuan City (TW)

(72) Inventors: Yung-Yun Chen, Taoyuan City (TW); Xuan-Huan Su, Taoyuan City (TW); Yu-Chi Kuo, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 212 days.

(21) Appl. No.: 18/155,463

(22) Filed: Jan. 17, 2023

(65) Prior Publication Data

US 2023/0230739 A1    Jul. 20, 2023

Related U.S. Application Data

(60) Provisional application No. 63/299,616, filed on Jan. 14, 2022.

(51) Int. Cl.
| | |
|---|---|
| *H01F 7/06* | (2006.01) |
| *G02B 27/64* | (2006.01) |
| *G03B 17/12* | (2021.01) |
| *H04N 23/55* | (2023.01) |
| *H04N 23/57* | (2023.01) |
| *H04N 23/65* | (2023.01) |
| *H04N 23/68* | (2023.01) |

(52) U.S. Cl.
CPC .......... *H01F 7/066* (2013.01); *G02B 27/646* (2013.01); *G03B 17/12* (2013.01); *H04N*

*23/55* (2023.01); *H04N 23/57* (2023.01); *H04N 23/65* (2023.01); *H04N 23/687* (2023.01)

(58) Field of Classification Search
CPC ................................ G03B 11/043; G03B 9/36
See application file for complete search history.

(56) References Cited

U.S. PATENT DOCUMENTS

| | | | | |
|---|---|---|---|---|
| 7,871,210 B2 * | 1/2011 | Masuzawa | ............. | H04N 23/55 348/374 |
| 7,883,280 B2 * | 2/2011 | Viglione | .................. | G03B 9/08 396/463 |
| 2009/0296183 A1 * | 12/2009 | Makii | ...................... | G03B 9/02 359/227 |
| 2010/0053412 A1 * | 3/2010 | Sekimoto | ............... | H04N 23/55 348/335 |
| 2020/0028998 A1 * | 1/2020 | Jun | ......................... | H04N 23/51 |
| 2020/0249415 A1 * | 8/2020 | Wang | ........................ | G03B 5/00 |
| 2021/0200062 A1 * | 7/2021 | Abe | ....................... | G06F 1/1656 |

* cited by examiner

*Primary Examiner* — Noam Reisner
(74) *Attorney, Agent, or Firm* — MUNCY, GEISSLER, OLDS & LOWE, P.C.

(57) ABSTRACT

An optical driving mechanism is provided. The optical driving mechanism includes a first movable part, a fixed part, and a first driving assembly. The first movable part is connected with an optical element. The first movable part is movable relative to the fixed part. The first driving assembly drives the first movable part to move relative to the fixed part. The fixing part has an opening.

17 Claims, 20 Drawing Sheets

220

222

224

OPTICAL DRIVING MECHANISM

CROSS REFERENCE TO RELATED APPLICATIONS

This application claims the benefit of U.S. Provisional Application No. 63/299,616, filed 2022 Jan. 14, the entirety of which is incorporated by reference herein.

BACKGROUND OF THE INVENTION

Field of the Invention

The present invention relates to a driving mechanism, and, in particular, to a driving mechanism that drives an optical element to move.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

It can be difficult to reduce the size of the shutter or aperture mechanism in the camera module of some electronic devices. Additionally, the movable mechanism inside these electronic devices may become damaged when the unit collides with external objects. Addressing these problems has become a challenge.

BRIEF SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, an optical driving mechanism is provided. The optical driving mechanism includes a first movable part, a fixed part, and a first driving assembly. The first movable part is connected to an optical element. The first movable part is movable relative to the fixed part. The first driving mechanism drives the first movable part to move relative to the fixed part. The fixed part has an opening.

According to some of the embodiments of the present disclosure, the optical element has an area disposed with a different color.

According to some of the embodiments of the present disclosure, the optical driving mechanism further includes a second driving assembly, wherein the opening is between the first driving assembly and the second driving assembly.

According to some of the embodiments of the present disclosure, the first driving assembly and the second driving assembly are electromagnetic driving assemblies.

According to some of the embodiments of the present disclosure, the optical driving mechanism further includes a second movable part. The second movable part moves relative to the fixed part. The optical element is connected to the second movable part.

According to some of the embodiments of the present disclosure, the optical driving mechanism further includes a magnet and a locking element. The magnet is disposed in the first movable part. The locking element is disposed in the fixed part, and the locking element cooperates with the second movable part.

According to some of the embodiments of the present disclosure, the first driving assembly includes a first coil, and the distance between the magnet and the first coil is different from the distance between the second movable part and the locking element.

According to some of the embodiments of the present disclosure, the distance between the magnet and the first coil is more than 0.15 mm. According to some of the embodiments of the present disclosure, the distance between the second movable part and the locking element is about 0.05 mm.

According to some of the embodiments of the present disclosure, the first driving assembly further includes a first magnetic element corresponding to the first coil. The first driving assembly is a linear driving assembly. According to some of the embodiments of the present disclosure, the second driving assembly is a rotary motor.

According to some of the embodiments of the present disclosure, the fixed part further includes a first base, a second base, and an outer cap. The first base accommodates the first movable part and the first driving assembly. The second base accommodates the second movable part and the second driving assembly. The outer cap is coupled to the first base and the second base.

According to some of the embodiments of the present disclosure, the bottom surface of the first base and the bottom surface of the second base are on the same surface.

According to some of the embodiments of the present disclosure, the first driving assembly includes a magnetic element, the attraction force between the magnet and the magnetic element causes the first base to contact the first movable part.

According to some of the embodiments of the present disclosure, the second base is separated from the first base.

According to some of the embodiments of the present disclosure, the first base includes two side outer surfaces and a plurality of first terminals that extend to the two side outer surfaces of the first base. The second base includes two side outer surfaces and a plurality of second terminals that extend to the two side outer surfaces of the second base.

According to some of the embodiments of the present disclosure, the first terminals are electrically connected to the first driving assembly. The second terminals are electrically connected to the second driving assembly.

According to some of the embodiments of the present disclosure, the optical driving mechanism further includes a sensing assembly. The second movable part includes a sensing magnet. The sensing assembly and the sensing magnet are arranged in the same direction as the direction in which the second movable part moves.

According to some of the embodiments of the present disclosure, the direction of the magnetic field of the sensing magnet is perpendicular to the plane on which the second movable part moves.

According to some of the embodiments of the present disclosure, the optical driving mechanism further includes a control circuit, wherein the sensing assembly transmits a position signal to the control circuit when the second movable part stops moving.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION OF THE INVENTION

Figure 1:
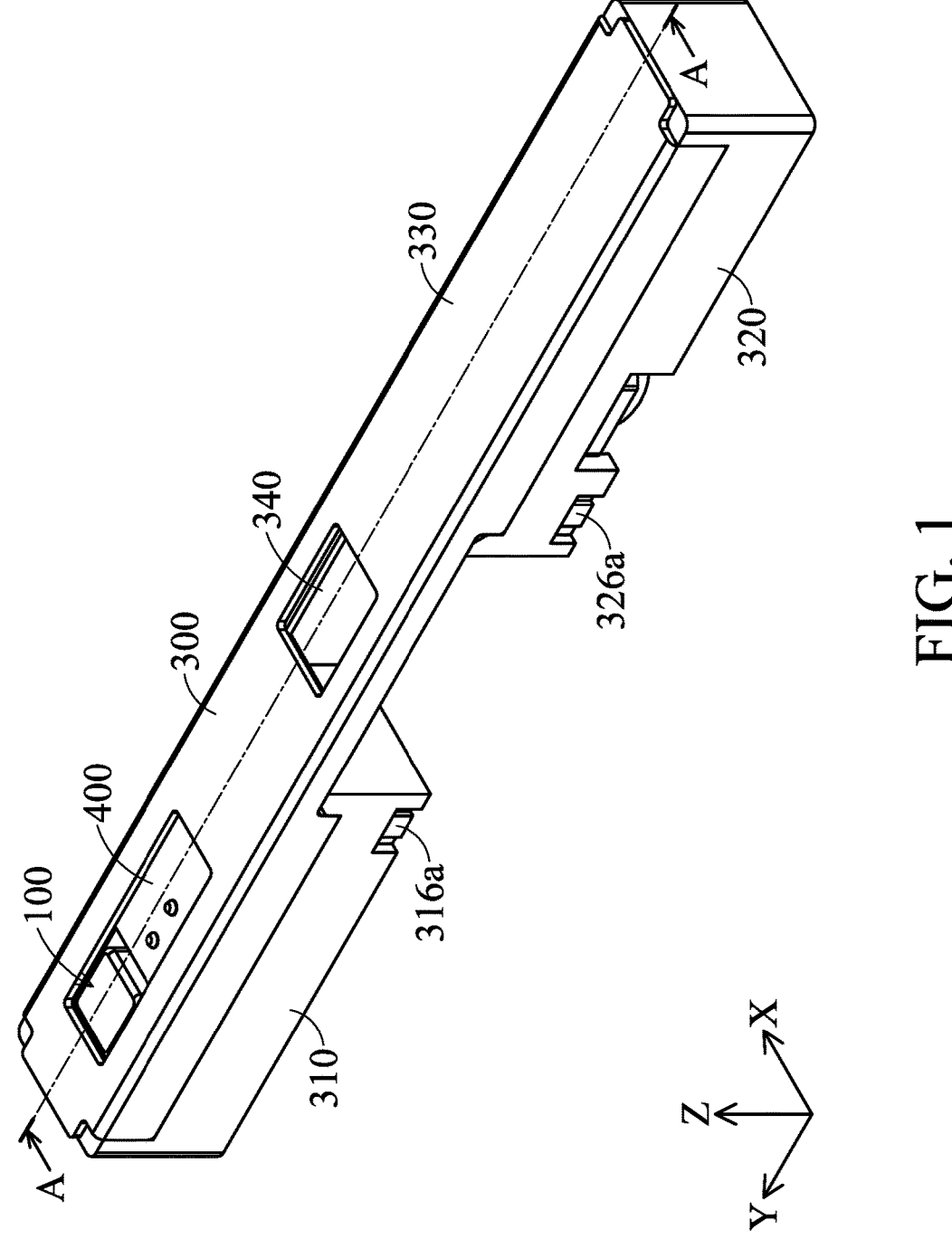
FIG. 1 shows a front perspective view of an optical driving mechanism, according to certain aspects of the present disclosure.

Various embodiments are described with reference to the attached FIGS., where like reference numerals are used throughout the FIGS. to designate similar or equivalent elements. The FIGS. are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of" or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
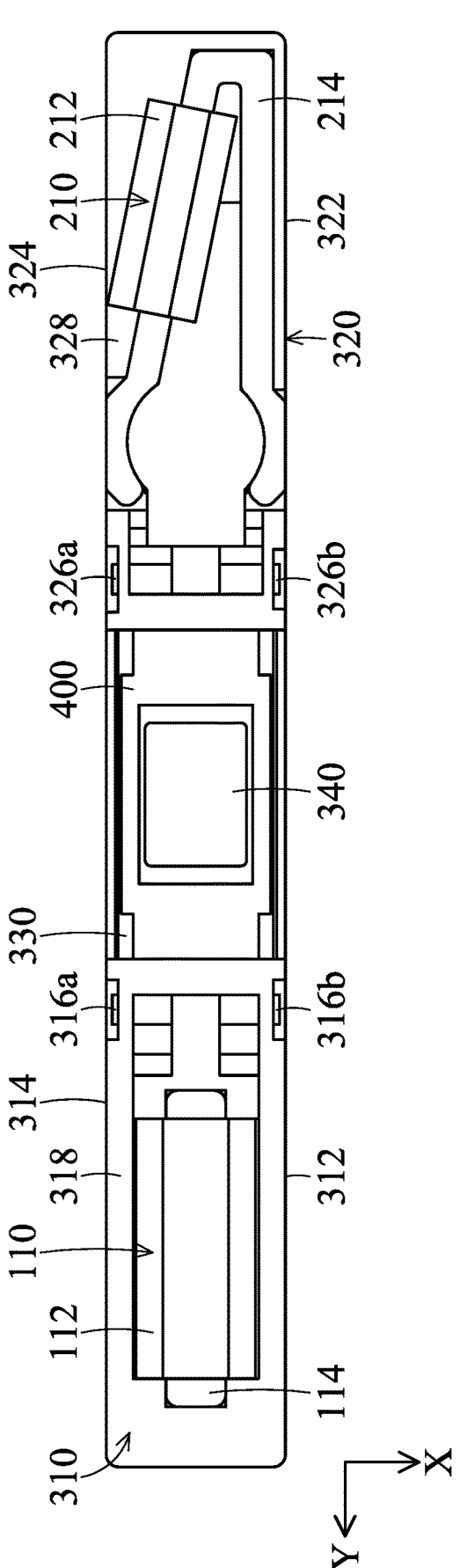
FIG. 2 shows a bottom view of the optical driving mechanism of FIG. 1, according to certain aspects of the present disclosure.
Figure 3:
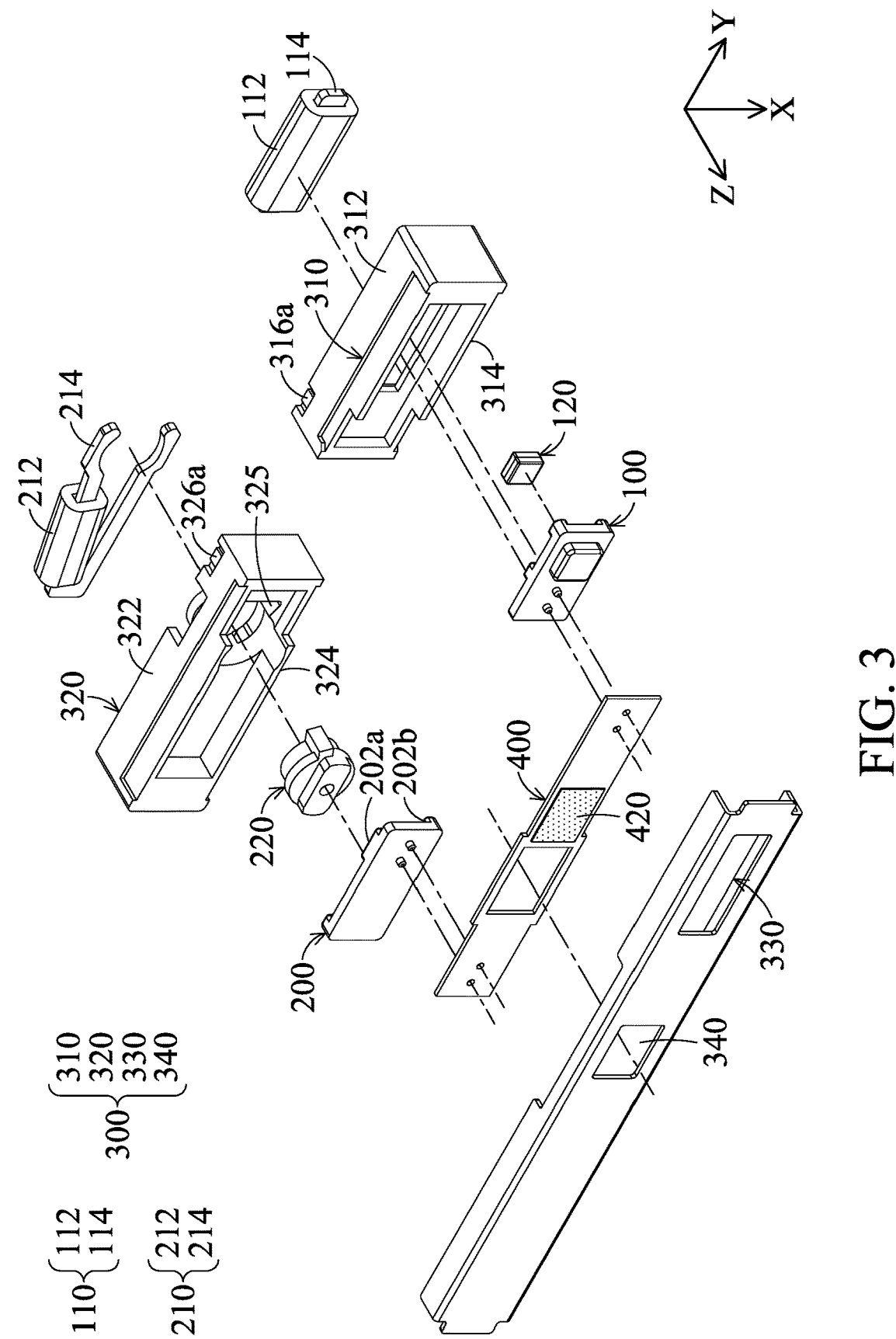
FIG. 3 shows an exploded perspective view of the optical driving mechanism of FIG. 1, according to certain aspects of the present disclosure.

First, please refer to FIGS. 1-3 together. FIG. 1 shows a front perspective view of an optical driving mechanism 1 according to certain aspects of the present disclosure. FIG. 2 shows a bottom view of the optical driving mechanism 1, according to certain aspects of the present disclosure. FIG. 3 shows an exploded perspective view of the optical driving mechanism 1 according to certain aspects of the present disclosure. The optical driving mechanism 1 includes a first movable part 100, a first driving assembly 110, a magnet 120, a second movable part 200, a second driving assembly 210, a locking element 220, a fixed part 300, and an optical element 400. The optical element 400 may be a shutter, an aperture, a filter, or a lens, etc. In this embodiment, the optical element 400 is used as a shutter.

The first movable part 100 is connected to the optical element 400, and the first movable part 100 may move relative to the fixed part 300. The first driving assembly 110 drives the first movable part 100 to move relative to the fixed part 300, as will be further explained below with respect to FIGS. 5-6B. The first driving assembly 110 is a linear driving assembly, including a first coil 112 and a first magnetic element 114. The magnet 120 is disposed on the first movable part 100.

Figure 7:
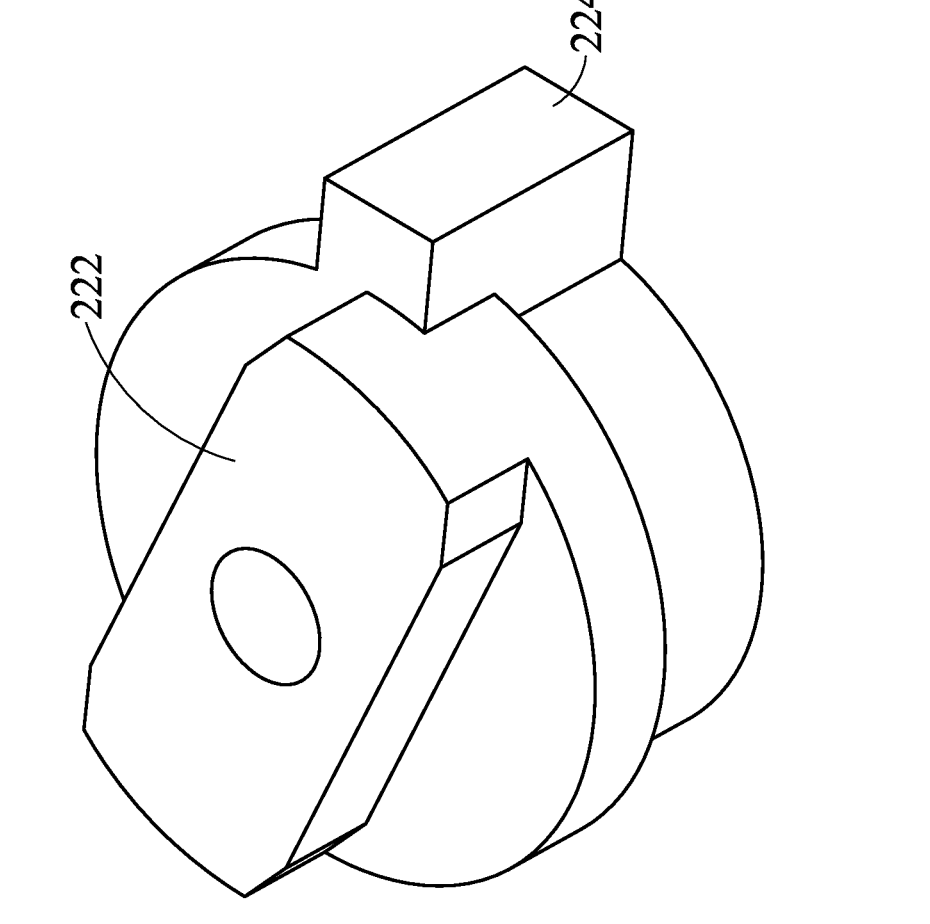
FIG. 7 shows a perspective view of a locking element of the optical driving mechanism of FIG. 1, according to certain aspects of the present disclosure.
Figure 8A:
FIG. 8A shows a top view of the left part of the optical driving mechanism of FIG. 1 with the optical driving mechanism in the closed position, according to certain aspects of the present disclosure. For illustrative purposes, a second movable part and a second base of the optical driving mechanism is shown in dashed lines.
Figure 8B:
FIG. 8B shows a top view of the left part of the optical driving mechanism of FIG. 1 with the optical driving mechanism between the closed position and the opened position, according to certain aspects of the present disclosure. For illustrative purposes, the second movable part and the second base of the optical driving mechanism is shown in dashed lines.
Figure 8C:
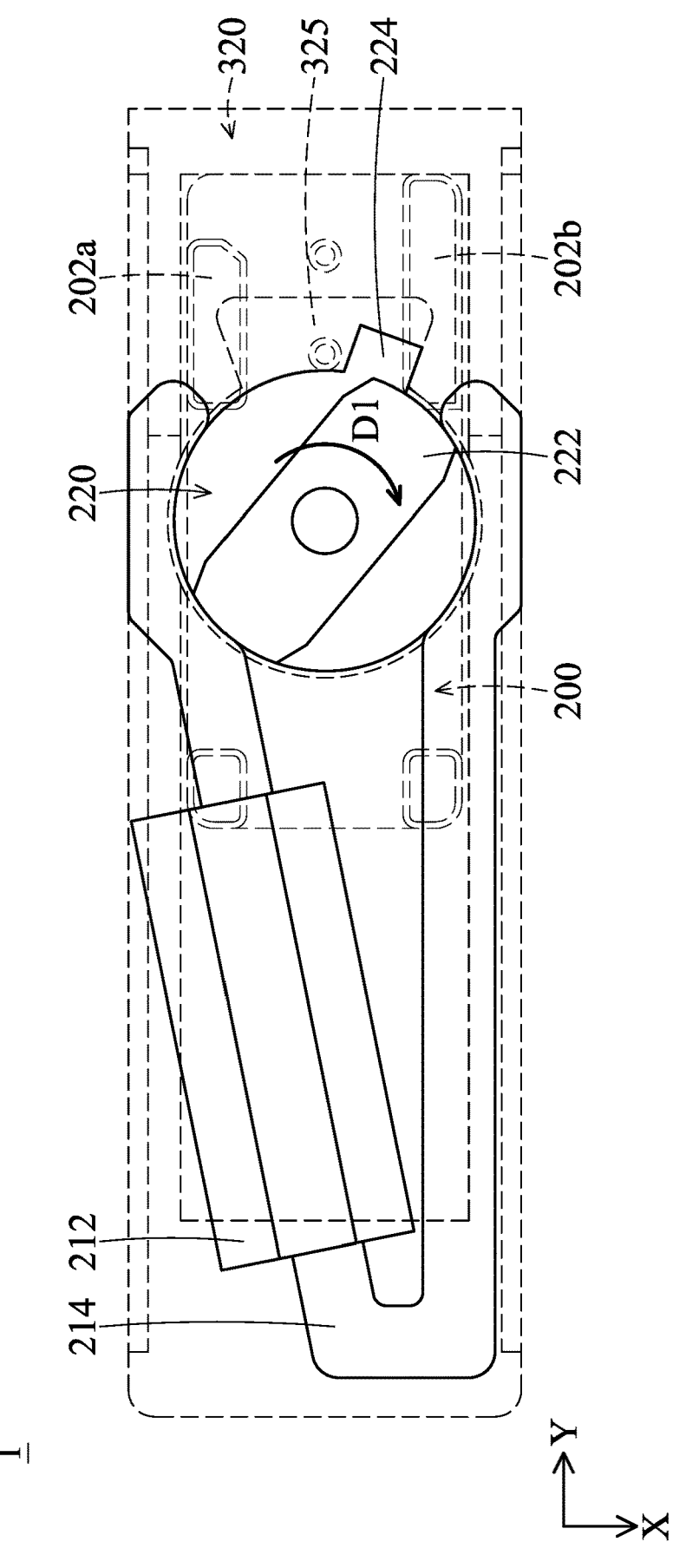
FIG. 8C shows a top view of the left part of the optical driving mechanism of FIG. 1 with the optical driving mechanism in the opened position, according to certain aspects of the present disclosure. For illustrative purposes, the second movable part and the second base of the optical driving mechanism is shown in dashed lines.

The second movable part 200 has two protrusions 202a, 202b (shown in FIGS. 8A-8C). The second driving assembly 210 drives the second movable part 200 to move relative to the fixed part 300, as will be further explained below with respect to FIGS. 7-10C. The second driving assembly 210 is a rotary motor, including a second coil 212 and a second magnetic element 214. The locking element 220 is disposed on the second movable part 200.

The fixed part 300 includes a first base 310, a second base 320, an outer cover 330, and an opening 340. The first base 310 has a bottom surface 318, the first driving assembly 110 is accommodated on a side of the bottom surface 318, and the first movable part 100 is accommodated on the other side of the bottom surface 318. The second base 320 is separated from the first base 310. The second base 320 has a bottom surface 328, the second driving assembly 210 is accommodated on a side of the bottom surface 328, and the second movable part 200 is accommodated on the other side of the bottom surface 328. The outer cover 330 is coupled to the first base 310 and the second base 320. The magnetic attraction force between the magnet 120 and the magnetic element 114 causes the first base 310 to abut the first movable part 100. When viewing from the Z-axis, the opening 340 is located between the first base 310 and the second base 320, the three of them are arranged in a straight line along the Y-axis.

The first base 310 further includes two outer surfaces 312, 314 and a plurality of first terminals 316a, 316b. The first terminals 316a, 316b are disposed in the first base 310 and extend to the two outer surfaces 312, 314 of the first base 310, then electrically connected to the first driving assembly 110. The second base 320 further includes two outer surfaces 322, 324, a recess 325, and a plurality of second terminals 326a, 326b. The second terminals 326a, 326b are disposed in the second base 320 and extend to two outer surfaces 322, 324 of the second base 320, then electrically connected to the second driving assembly 210. That is, the first driving assembly 110 is powered by the first terminals 316a, 316b, and the second driving assembly 210 is powered by the second terminals 326a, 326b. Their separate electromagnetic systems make the first driving assembly 110 and the second driving assembly 210 less susceptible to each other's interference.

Figure 4A:
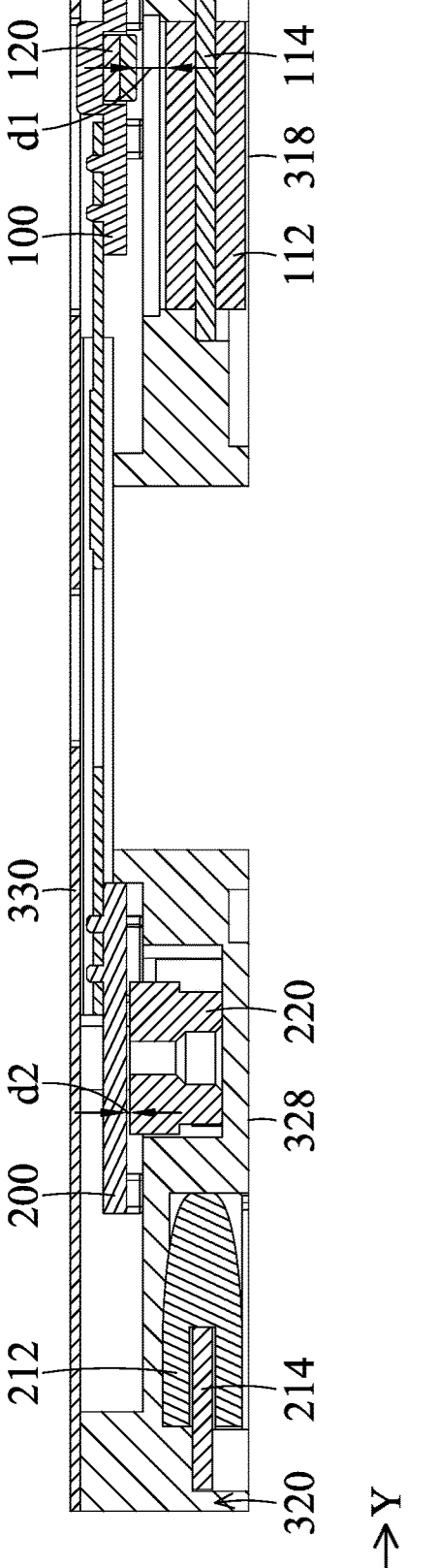
FIG. 4A shows a cross-sectional view of the optical driving mechanism of FIG. 1 along line A-A, according to certain aspects of the present disclosure.
Figure 4B:
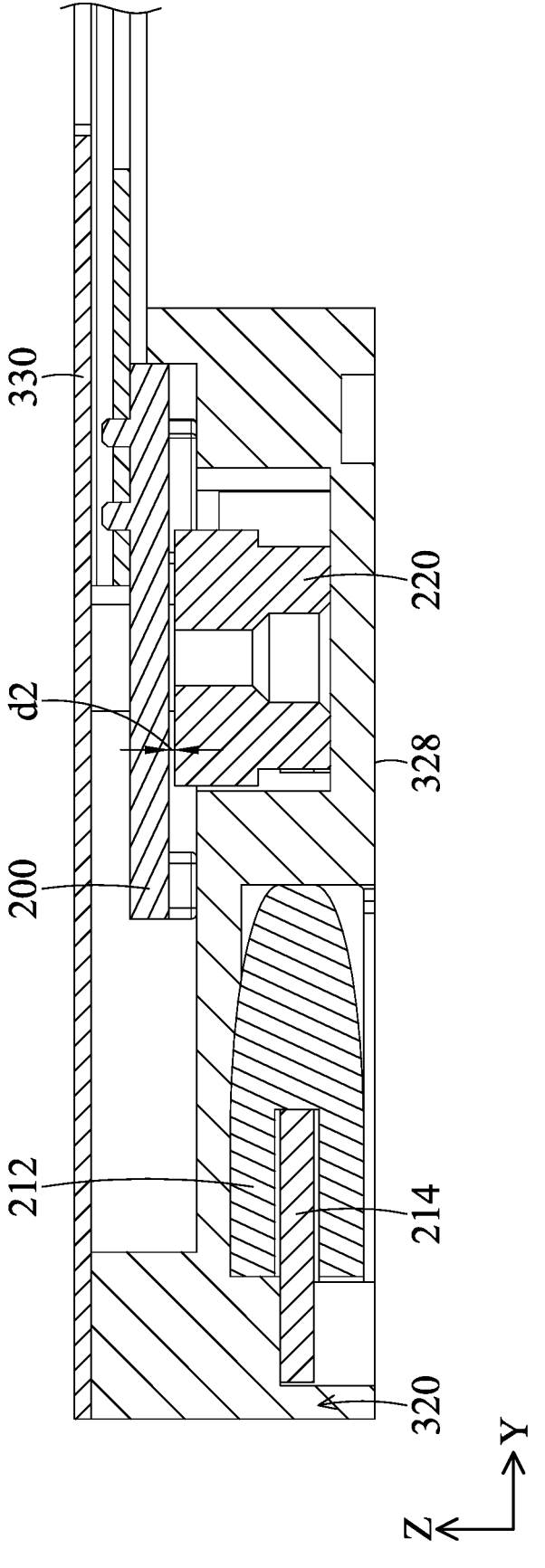
FIG. 4B shows a cross-sectional view of the left part of the optical driving mechanism of FIG. 1 along line A-A, according to certain aspects of the present disclosure.
Figure 4C:
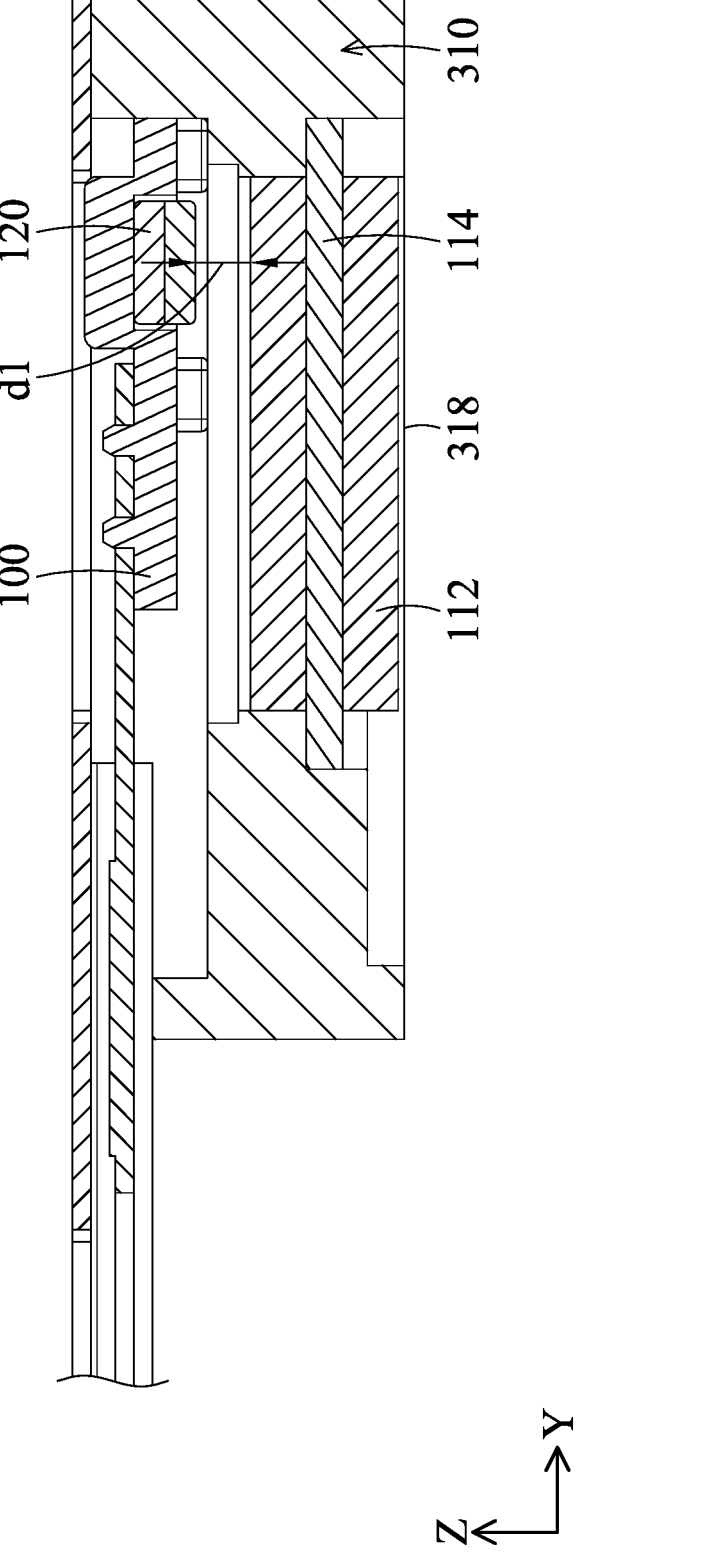
FIG. 4C shows a cross-sectional view of the right part of the optical driving mechanism of FIG. 1 along line A-A, according to certain aspects of the present disclosure.

Please refer to FIGS. 4A-4C. FIG. 4A shows a cross-sectional view of the optical driving mechanism 1 along line A-A viewing from the X-axis, according to certain aspects of the present disclosure. FIG. 4B shows a cross-sectional view of the left half of the optical driving mechanism 1 along line A-A, according to certain aspects of the present disclosure. FIG. 4C shows a cross-sectional view of the right half of the optical driving mechanism 1 along line A-A according to certain aspects of the present disclosure. The right half of the optical driving mechanism 1 includes the first movable part 100, the first driving assembly 110, and the first base 310, and the left half of the optical driving mechanism 1 includes the second movable part 200, the second driving assembly 210, and the second base 320. The bottom surface 318 of the first base 310 and the bottom surface 328 of the second base 320 may be located on the same plane. The plane can be, for example, the upper surface of a control circuit board. For example, an optical module may be assembled based on the plane. A distance d1 between the magnet 120 and the first coil 112 is different from a distance d2 between the second movable part 200 and the locking element 220. The distance d1 between the magnet 120 and the first coil 112 is greater than 0.15 mm, and the distance d2 between the second movable part 200 and the locking element 220 is about 0.05 mm. It should be noted that the distance d1 between the magnet 120 and the first coil 112 should not be too small to prevent too strong friction due to the adsorption force. Adhesive may be applied to the remaining gap of the assembly, which may be used for height adjustment and shock absorption.

Please refer to FIG. 3 again, the opening 340 of the fixed part 300 is located between the first driving assembly 110 and the second driving assembly 210. The opening 340 corresponds to an optical module (not shown in the FIG., which may be, for example, a camera, a light source, etc.). The optical element 400 connects the first movable part 100 and the second movable part 200. An area 420 is disposed with different color on the optical element 400. The area 420 may have, for example, a light-shielding material, which may effectively prevent light from passing through the opening 340 and reaching an image sensor (not shown) inside the optical module. The arrangement of the opening 340 between the first driving assembly 110 and the second driving assembly 210 makes the structure of the opening 340 have a higher strength. The two sides of the optical element 400 have the support from the first movable part 100 and the second movable part 200 respectively, therefore the force may be more balanced. The distance between the first driving assembly 110 and the second driving assembly 210 may prevent the electromagnetic systems of the two from interfering with each other.

Figure 5:
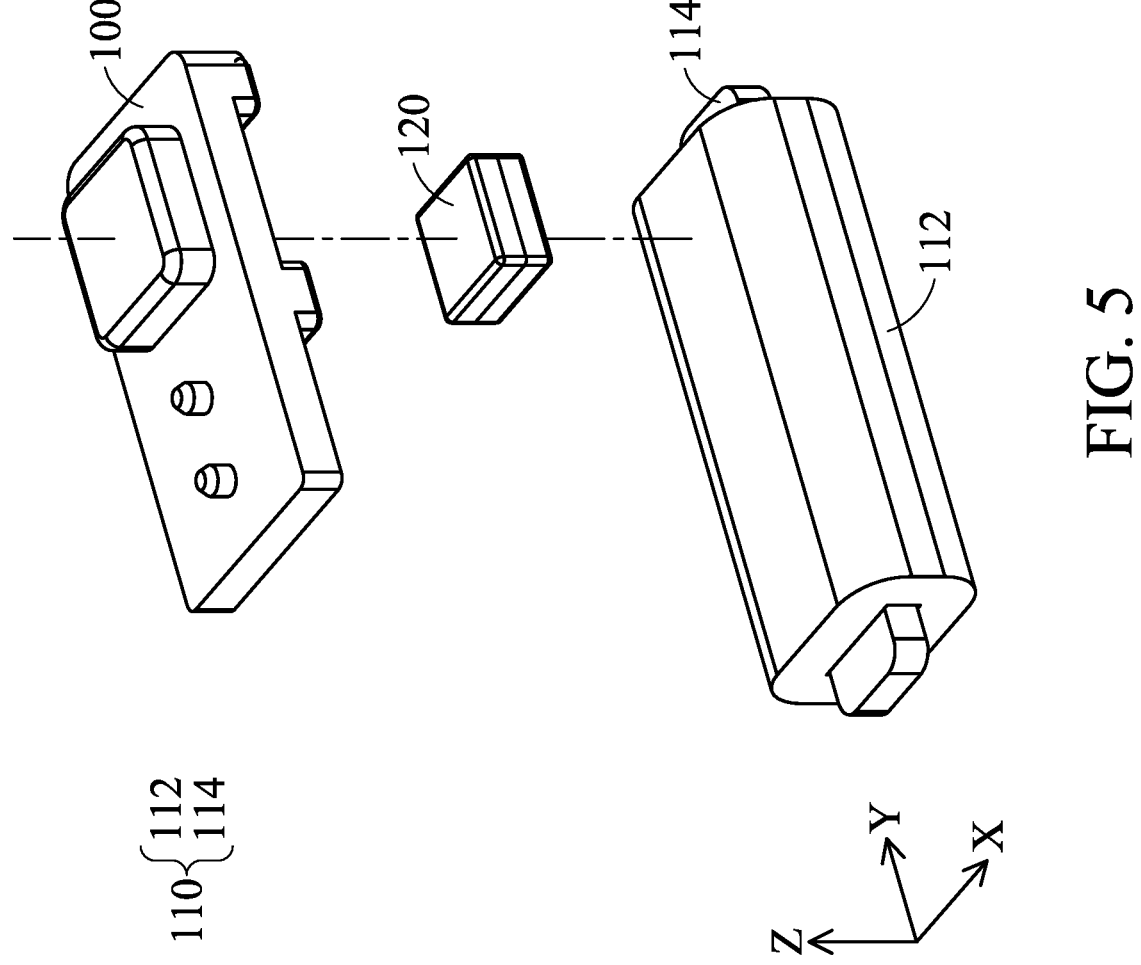
FIG. 5 shows a front perspective view of a first driving assembly and a first movable part of the optical driving mechanism of FIG. 1, according to certain aspects of the present disclosure.

Please refer to FIG. 5. FIG. 5 shows a front perspective view of the first driving assembly 110 and the first movable part 100, according to certain aspects of the present disclosure. The first coil 112 and the first magnetic element 114 of the first driving assembly 110 may generate a magnetic field to drive the magnet 120 and the first movable part 100 to move along the Y direction.

Figures 6A, 6B:
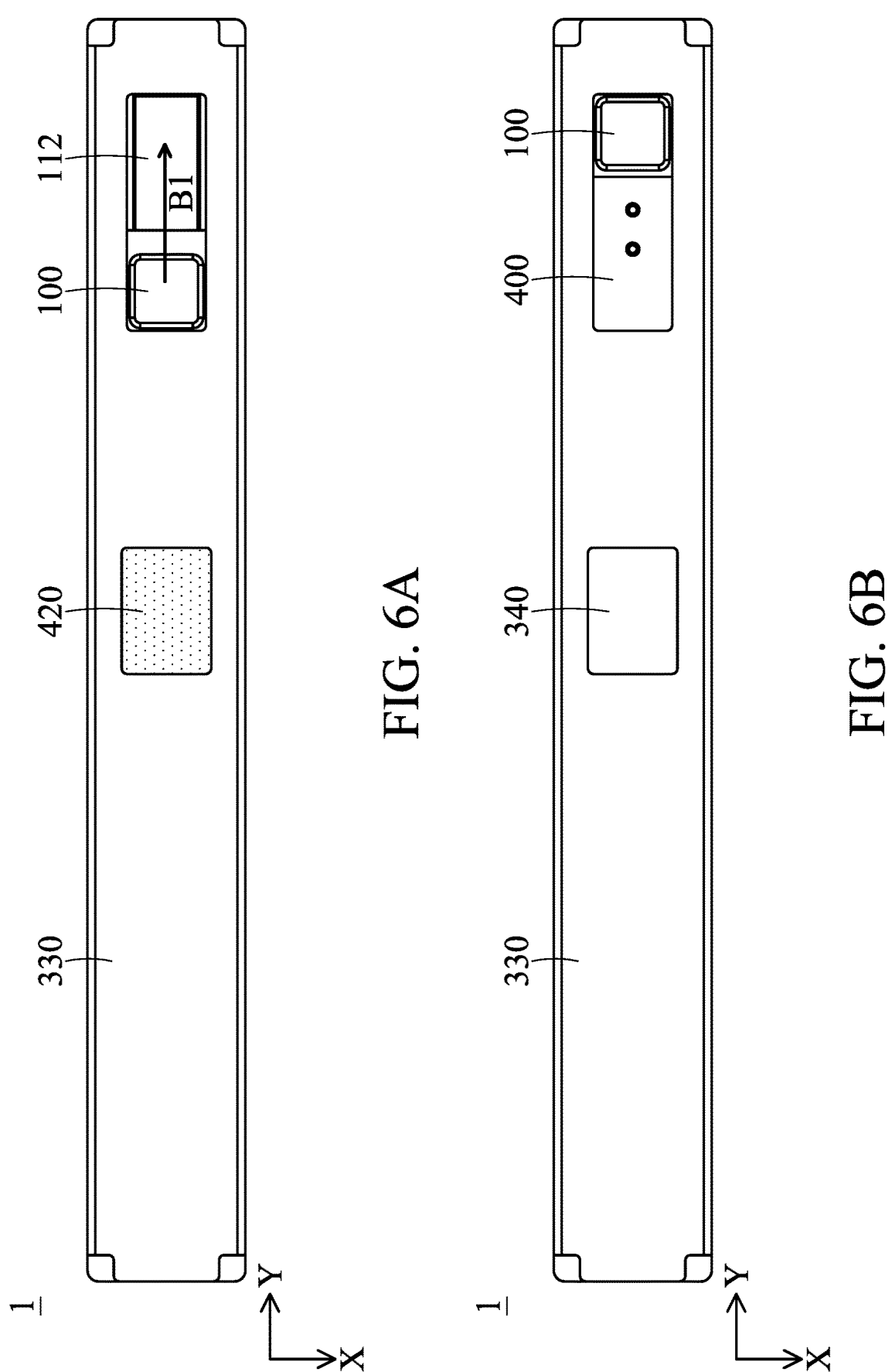
FIG. 6A shows a top view of the optical driving mechanism of FIG. 1 in a closed position, according to certain aspects of the present disclosure.
FIG. 6B shows a top view of the optical driving mechanism of FIG. 1 in an opened position, according to certain aspects of the present disclosure.

Next, please refer to FIG. 6A and FIG. 6B together. FIG. 6A shows a top view of the optical driving mechanism 1 in a closed position, according to certain aspects of the present disclosure. FIG. 6B shows a top view of the optical driving mechanism of FIG. 1 in an open position, according to certain aspects of the present disclosure. Referring to FIG. 6A, when the optical driving mechanism 1 is in the closed position, the area 420 of the optical element 400 covers the opening 340. When the optical driving mechanism 1 is powered on, the plurality of first terminals 316a, 316b transmit a current to the first coil 112. The first coil 112 and the first magnetic element 114 generate a magnetic field to drive the magnet 120, the first movable part 100, the optical element 400 to move in the direction of an arrow B1, until the optical driving mechanism 1 is in the open position, as shown in FIG. 6B. As a result, the area 420 of the optical element 400 no longer covers the opening 340.

Please refer to FIG. 7. FIG. 7 shows a perspective view of a locking element 220, according to certain aspects of the present disclosure. The locking element 220 is a magnet and has a locking mechanism 222 and a stopper 224. In this embodiment, the locking mechanism 222 is a protruding part, and may cooperate with the protrusions 202a, 202b of the second movable part 200.

Next, please refer to FIG. 8A to FIG. 8C. FIG. 8A shows a top view of the left half of the optical driving mechanism 1 the closed position, according to certain aspects of the present disclosure. FIG. 8B shows a top view of the left half of the optical driving mechanism 1 in between the closed position and the open position, according to certain aspects of the present disclosure. FIG. 8C shows a top view of the left half of the optical driving mechanism 1 in the open position, according to certain aspects of the present disclosure, wherein for illustrative purposes, the second movable part 200 and the second base 320 are shown in dashed line. The second coil 212 and the second magnetic element 214 of the second driving assembly 210 may generate a magnetic field to drive the locking element 220 to rotate around the center along the Z-axis direction as the axis.

When the optical driving mechanism 1 in the closed position is powered on, so that the second terminals 326a, 326b (shown in FIG. 2) transmit a current in the first direction to the second coil 212, the current in the first direction causes the second coil 212 and the second magnetic element 214 generate a magnetic field. The magnetic field drives the locking element 220 to rotate along the direction of the arrow D1. The stopper 224 of the locking element 220 contacts with an edge of the recess 325 of the second base 320 to block the locking element 220 from rotating further and then stops the movement of the locking element 220. Meanwhile the locking mechanism 222 of the locking element 220 blocks the protrusion 202a of the second movable part 200, and further blocks the movement of the second movable part 200 in the Y direction relative to the locking element 220, so as shown in FIG. 8A, the optical driving mechanism 1 is fixed in the closed position.

When the optical driving mechanism 1 located in the closed position is intended to be moved to the open position, the second terminals 326a, 326b (shown in FIG. 2) transmit a current in a second direction to the second coil 212, wherein the second direction is opposite from the first direction. The current in the second direction causes the second coil 212 and the second magnetic element 214 to generate another magnetic field, driving the locking element 220 to rotate in the direction of the arrow D2. The stopper 224 of the locking element 220 contacts with another opposite edge of the recess 325 of the second base 320 to prevent the locking element 220 from rotating further and then stops the movement of the locking element 220. Meanwhile the space around the locking element 220 allows the protrusions 202a and 202b of the second movable part 200 to pass through, thereby allowing the second movable part 200 to move relative to the locking element 220 in the direction of the arrow C1, as shown in FIG. 8B.

At this time, the second movable part 200 may be driven by the first movable part 100 together with the optical element 400, and the optical driving mechanism 1 may move between the closed position and the open position, as described above with reference to FIG. 6A and FIG. 6B. The first coil 112 and the first magnetic element 114 generate a magnetic field to drive the driving magnet 120, the first movable part 100, the optical element 400, and the second movable part 200 (not shown in the FIG.s) to move in the direction of the arrow B1. They move together until the optical the driving mechanism 1 is in the open position, as shown in FIG. 6B, so that the area 420 of the optical element 400 no longer covers the opening 340.

Please refer to FIG. 8C again. After the optical driving mechanism 1 has been moved to the open position, the second terminals 326a, 326b (shown in FIG. 2) transmit a current in the first direction to the second coil 212. The current in the first direction causes the second coil 212 and the second magnetic element 214 to generate a magnetic field to drive the locking element 220 to rotate in the direction of the arrow D1. The stopper 224 of the locking element 220 contacts with the edge of the recess 325 of the second base 320 to block the locking element 220 from rotating further and then stops the movement of the locking element 220. Meanwhile the locking mechanism 222 of the locking element 220 blocks the protrusion 202b of the second movable part 200, and further blocks the movement of the second movable part 200 in the Y direction relative to the locking element 220, so as shown in FIG. 8C, the optical driving mechanism 1 is fixed in the open position.

If intended to return to the closed position, the second terminals 326a, 326b (shown in FIG. 2) transmit a current in the second direction to the second coil 212, so that the second coil 212 and the second magnetic element 214 generate another magnetic field that drives the locking element 220 to rotate in the direction of the arrow D2. The stop portion 224 of the locking element 220 contacts with the opposite edge of the recess 325 of the second base 320 to block the locking element 220 from rotating further and then stops the movement of the locking element 220. Meanwhile the space around the locking element 220 allows the protrusions 202a and 202b of the second movable part 200 to pass through, thereby allowing the second movable part 200 to move in the Y direction relative to the locking element 220, and move in the direction opposite to C1, returning to the closed position.

Figure 9:
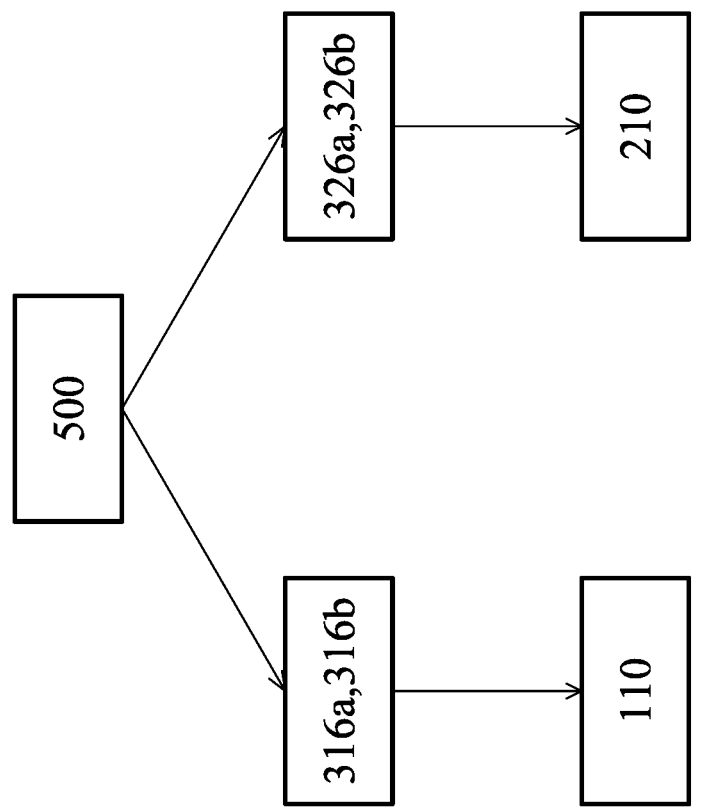
FIG. 9 shows a block diagram of the optical driving mechanism of FIG. 1, according to certain aspects of the present disclosure.

FIG. 9 is a block diagram of the optical driving mechanism 1, according to certain aspects of the present disclosure. The optical driving mechanism 1 may further include a control circuit 500. When the optical driving mechanism 1 is powered on, the control circuit 500 sends signals to the first terminals 316*a*, 316*b* and the second terminals 326*a*, 326*b* respectively. The first terminals 316*a*, 316*b* and the second terminals 326*a*, 326*b* respectively transmit a current to the first coil 112 and the second coil 212 to drive the first driving assembly 110 and the second driving assembly 210.

Although the locking mechanism 222 and the second movable part 200 described above are protrusions, the locking mechanism 222 and the second movable part 200 may be configured in any suitable manner, and are not limited to the protruding part and the protrusions. Another configuration of the locking mechanism and the second movable part will be described below according to another embodiment of the present disclosure.

Figure 10:
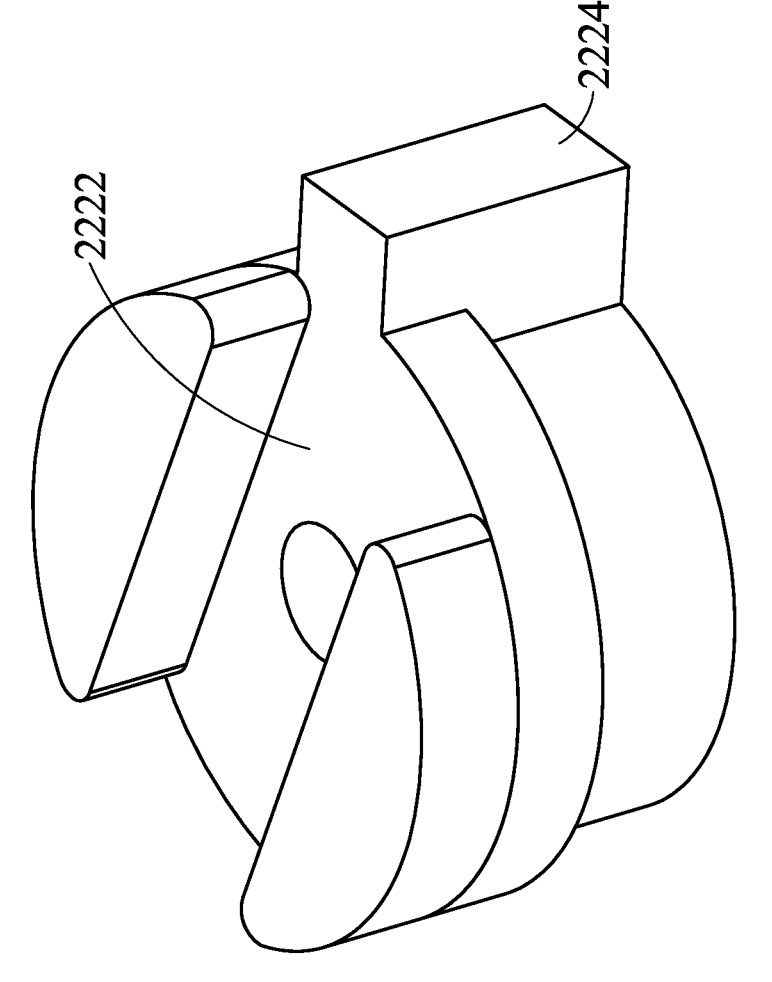
FIG. 10 shows a perspective view of a locking element of another optical driving mechanism of FIG. 1, according to another embodiment of the present disclosure.
Figure 11A:
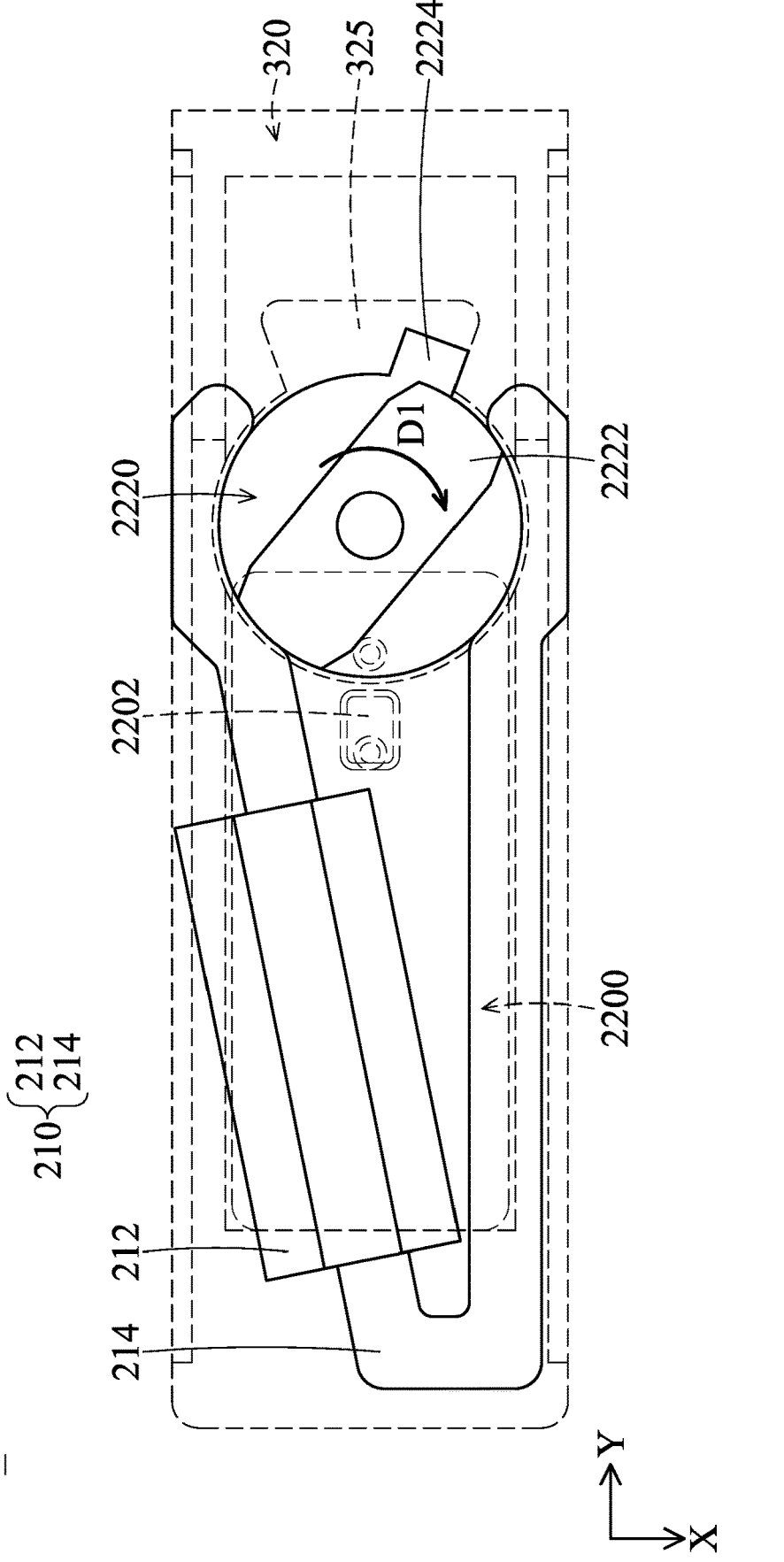
FIG. 11A shows a top view of the left part of the optical driving mechanism of FIG. 10 with the optical driving mechanism in the closed position, according to another embodiment of the present disclosure. For illustrative purposes, a second movable part and a second base of the optical driving mechanism is shown in dashed lines.
Figure 11B:
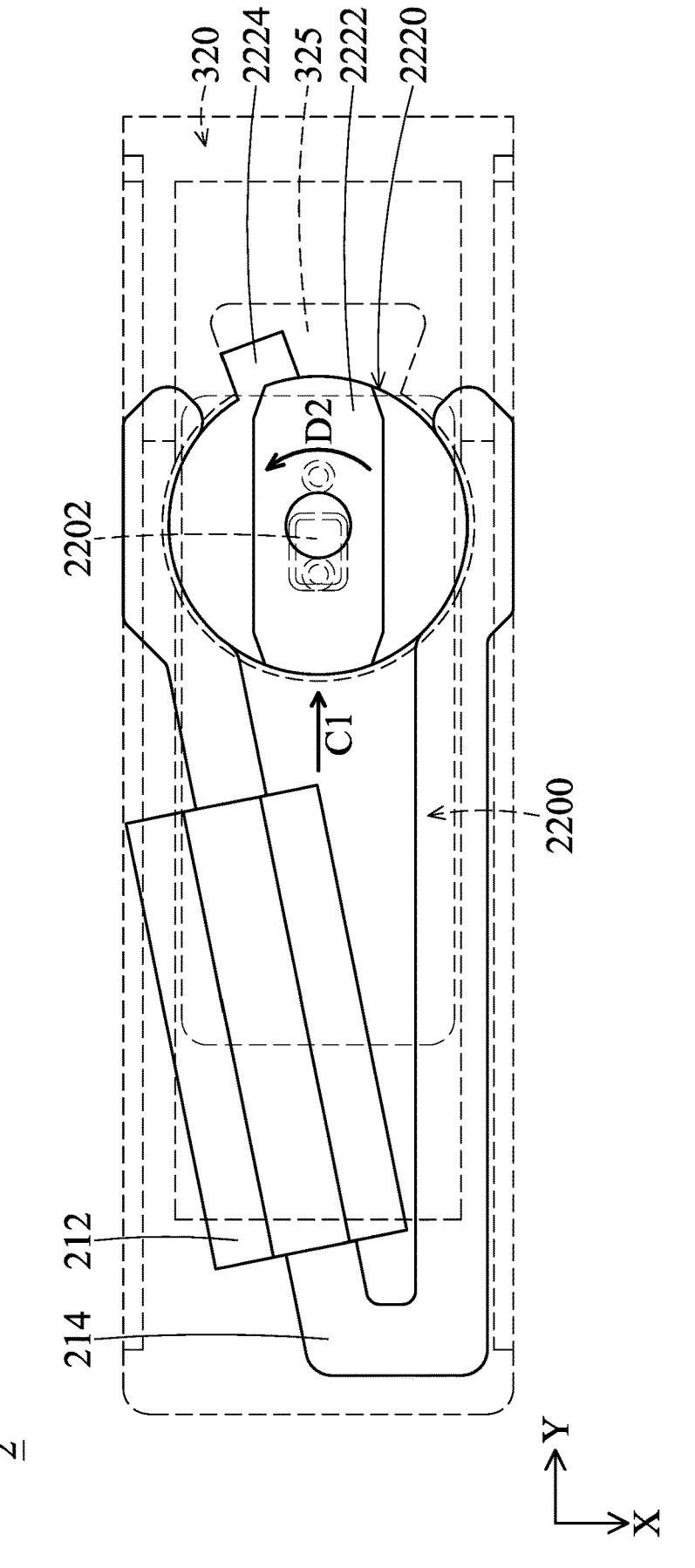
FIG. 11B shows a top view of the left part of the optical driving mechanism of FIG. 10 with the optical driving mechanism between the closed position and the opened position, according to another embodiment of the present disclosure. For illustrative purposes, the second movable part and the second base of the optical driving mechanism is shown in dashed lines.
Figure 11C:
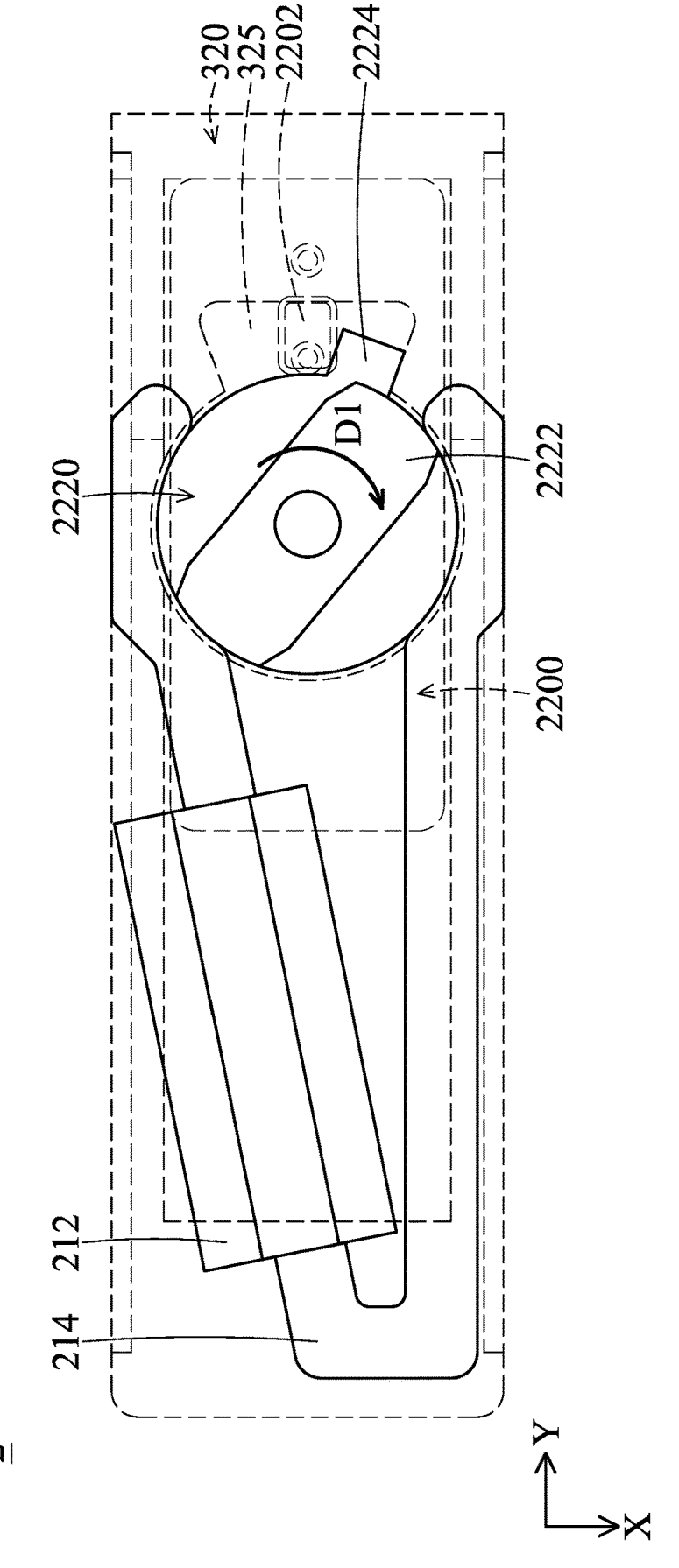
FIG. 11C shows a top view of the left part of the optical driving mechanism of FIG. 10 with the optical driving mechanism in the opened position, according to another embodiment of the present disclosure. For illustrative purposes, the second movable part and the second base of the optical driving mechanism is shown in dashed lines.

Next, please refer to FIG. 10 to FIG. 11C. FIG. 10 shows a perspective view of a locking element 2220 of another optical driving mechanism 2, according to another embodiment of the present disclosure. FIG. 11A shows a top view of the left half of the optical driving mechanism 2 in the closed position, according to another embodiment of the present disclosure. FIG. 11B shows a top view of the left half of the optical driving mechanism 2 between the closed position and the open position, according to another embodiment of the present disclosure. FIG. 11C shows a top view of the left half of the optical driving mechanism 2 in the open position, according to another embodiment of the present disclosure, wherein for illustrative purposes, the second movable part 2200 of the optical driving mechanism 2 and the second base 320 are shown in dashed lines. The optical driving mechanism 2 is similar to the optical driving mechanism 1, wherein the same hundreds, tens and ones digits are used for reference numbers of like elements. The difference between the optical driving mechanism 2 and the optical driving mechanism 1 lies in the locking mechanism 2222 of the locking element 2220 and the second movable part 2200 of the optical driving mechanism 2.

The second movable part 2200 of the optical driving mechanism 2 has a protrusion 2202. The locking element 2220 is a magnet and has a locking mechanism 2222 and a stopper 2224. In this embodiment, the locking mechanism 2222 is a groove, and cooperates with the protrusion 2202 of the second movable part 2200.

When the optical driving mechanism 2 in the closed position is power on, so that the second terminal transmits a current in the first direction to the second coil 212, the current in the first direction causes the second coil 212 and the second magnetic element 214 to generate a magnetic field. The magnetic field drives the locking element 2220 to rotate in the direction of arrow D1. The stopper 2224 of the locking element 2220 contacts with the edge of the recess 325 of the second base 320 to block the locking element 2220 from rotating further and then stops movement of the locking element 2220. Meanwhile the locking element 2220 blocks the protrusion 2202 of the second movable part 2200, and further blocks the movement of the second movable part 2200 in the Y direction relative to the locking element 2220, so as shown in FIG. 11A, the optical driving mechanism 2 is fixed in the closed position.

When the optical driving mechanism 2 in the closed position is intended to be moved to the open position, the second terminal transmits a current in the second direction to the second coil 212. The current in the second direction causes the second coil 212 and the second magnetic element 214 to generate another magnetic field. The magnetic field drives the locking element 2220 to rotate in the direction of the arrow D2. The stopper 2224 of the locking element 2220 contacts with the opposite edge of the recess 325 of the second base 320 to block the locking element 2220 from rotating further and then stops the movement of the locking element 2220. Meanwhile the groove of the locking mechanism 2222 allows the protrusion 2202 of the second movable part 2200 to pass through, thereby allowing the second movable part 2200 to move relative to the locking element 2220 in the direction of the arrow C1, as shown in FIG. 11B.

At this time, the second movable part 2200 may be driven by the first movable part together with the optical element, and the optical driving mechanism 2 may move between the closed position and the open position.

Please refer to FIG. 11C again. After the optical driving mechanism 2 has moved to the open position, the second terminal transmits a current in the first direction to the second coil 212. The current in the first direction causes the second coil 212 and the second magnetic element 214 to generate a magnetic field to drive the locking element 2220 to rotate along the direction of the arrow D1. The stopper 2224 of the locking element 2220 contacts with the edge of the recess 325 of the second base 320 to block the locking element 2220 from rotating further and then stops the movement of the locking element 2220. Meanwhile the locking element 2220 blocks the protrusion 2202 of the second movable part 2200, and further blocks the movement of the second movable part 2200 in the Y direction relative to the locking element 2220, so as shown in FIG. 11C, the optical driving mechanism 2 is fixed in the open position.

If intended to return to the closed position, the second terminal transmits a current in the second direction to the second coil 212, so that the second coil 212 and the second magnetic element 214 generate another magnetic field. The magnetic field drives the locking element 2220 to rotate along a direction of the arrow D2. The stopper 2224 of the locking element 2220 contacts with the opposite edge of the recess 325 of the second base 320 to block the locking element 2220 from rotating further and then stops the movement of the locking element 2220. Meanwhile the groove of the locking mechanism 2222 allows the protrusion 2202 of the second movable part 2200 to pass through, thereby allowing the second movable part 2200 to move in the Y direction relative to the locking element 2220, and move in the opposite direction of C1 to return to the closed position.

Figure 12A:
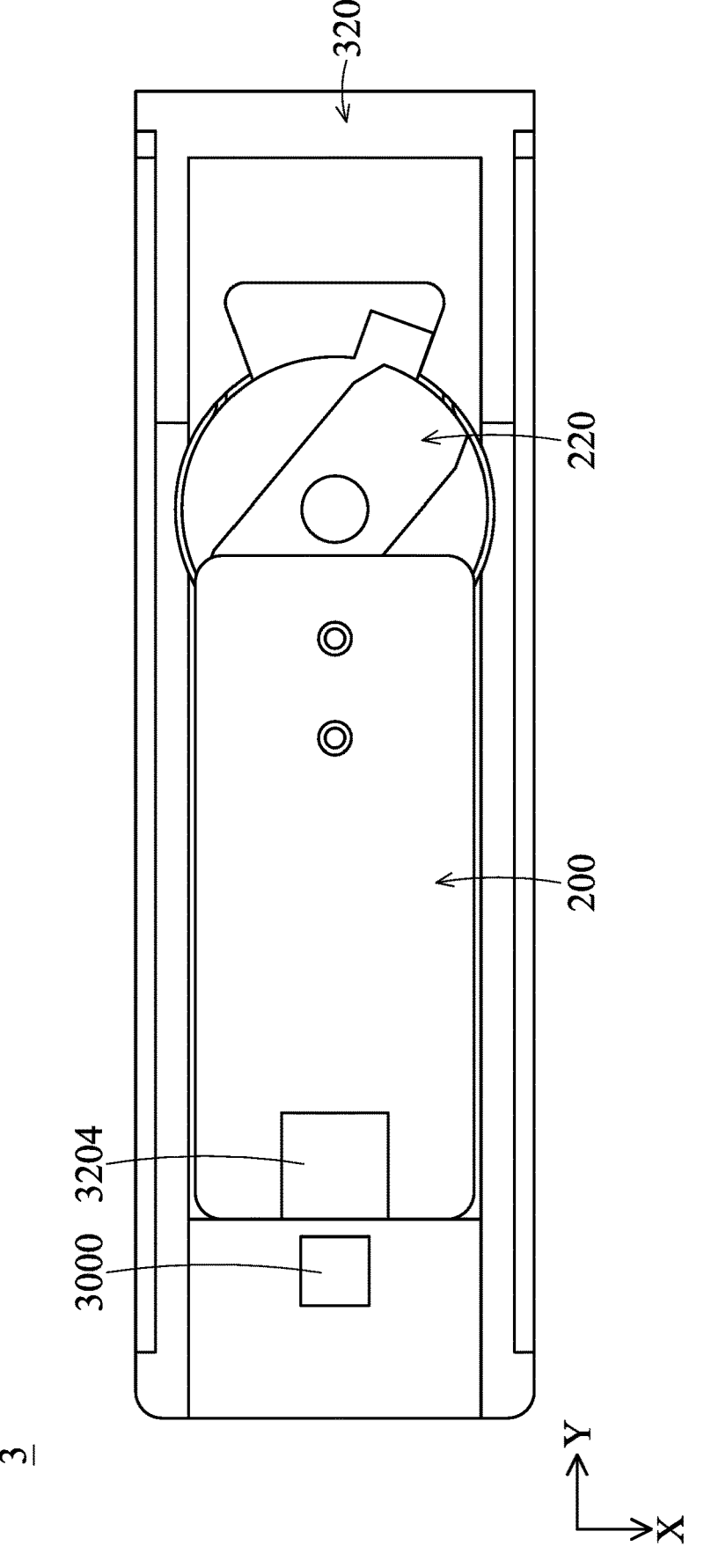
FIG. 12A shows a top view of the left part of another optical driving mechanism with the optical driving mechanism in the closed position, according to another embodiment of the present disclosure.
Figure 12B:
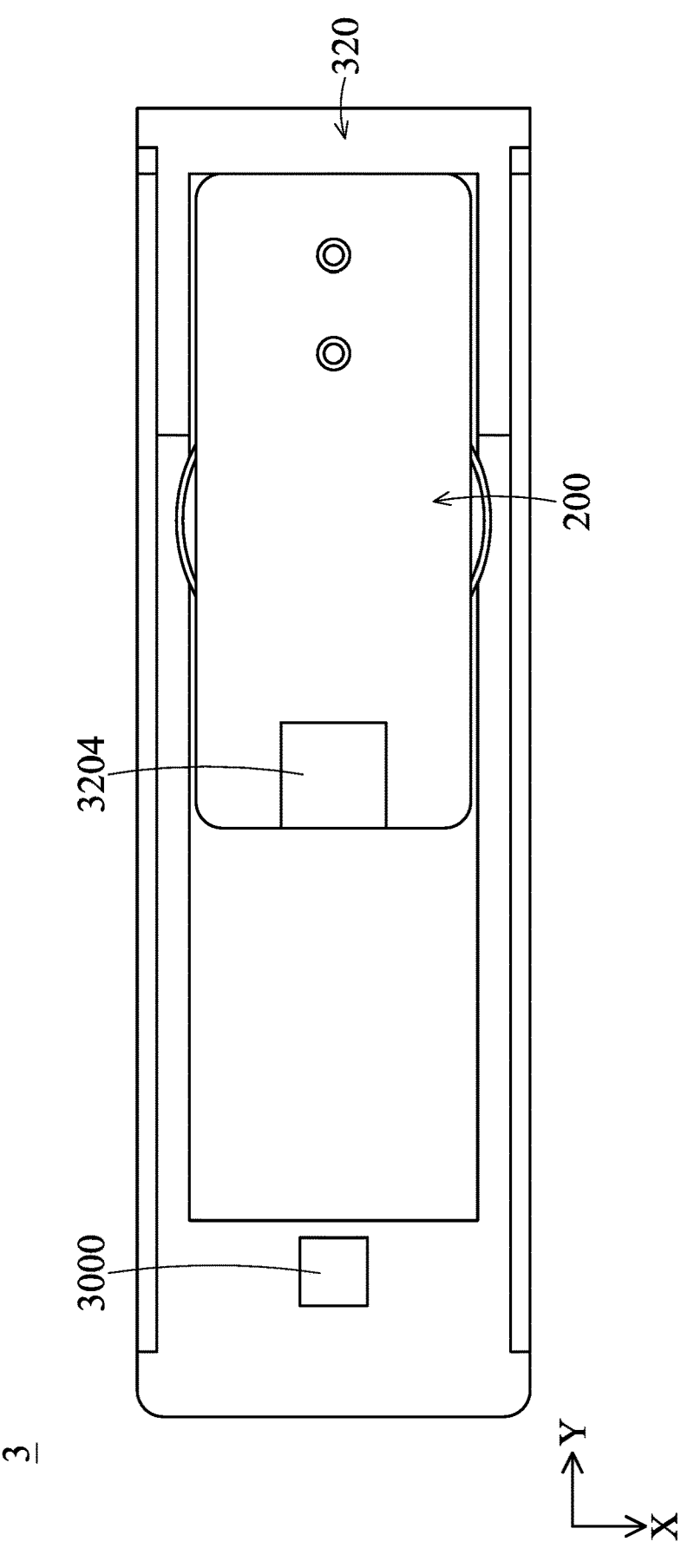
FIG. 12B shows a top view of the left part of the optical driving mechanism of FIG. 12A with the optical driving mechanism in the opened position, according to another embodiment of the present disclosure.

Next, please refer to FIG. 12A and FIG. 12B. FIG. 12A shows a top view of the left half of another optical driving mechanism 3 in the closed position, according to another embodiment of the present disclosure. FIG. 12B shows a top view of the left half of the optical driving mechanism 3 in the open position, according to another embodiment of the present disclosure. The optical driving mechanism 3 is similar to the optical driving mechanism 1, wherein the same hundreds, tens and ones digits are used for reference numbers of like elements.

The difference between the optical driving mechanism 3 and the optical driving mechanism 1 is that the optical driving mechanism 3 further includes a sensing assembly 3000, and the second movable part 200 of the optical driving mechanism 3 further includes a sensing magnet 3204. The direction of the arrangement of the sensing assembly 3000 and the sensing magnet 3204 is the same as the moving direction of the second movable part 200. The magnetic pole direction of the sensing magnet 3204 is perpendicular to the moving plane of the second moving part 200. That is, the magnetic pole direction of the sensing magnet 3204 is along the Z-axis direction.

Figure 13:
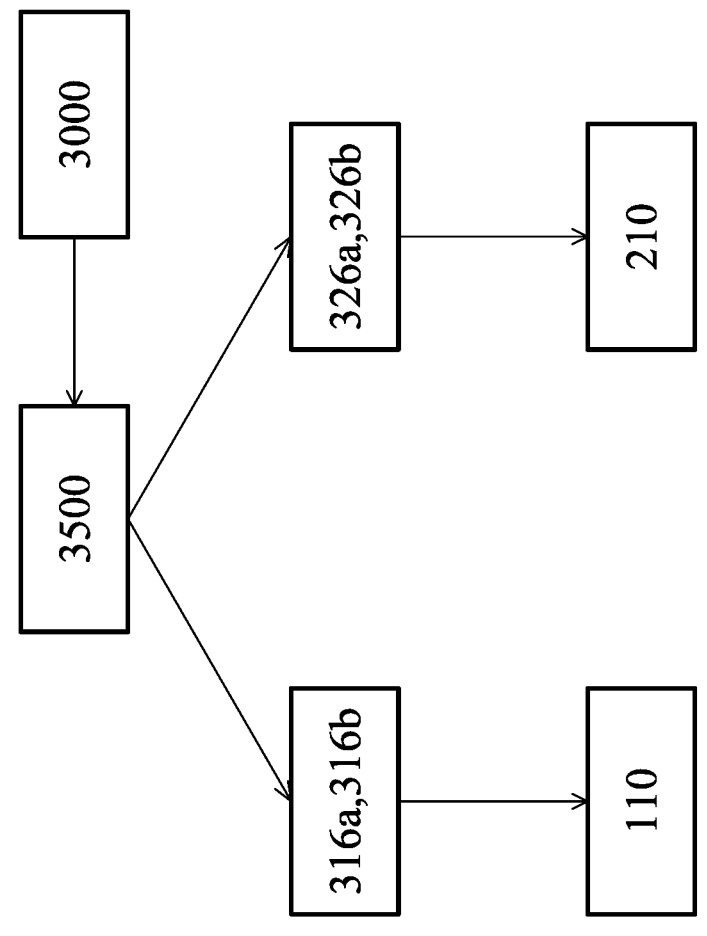
FIG. 13 shows a block diagram of the optical driving mechanism of FIG. 12A, according to another embodiment of the present disclosure.

Next, please refer to FIG. 13 together. FIG. 13 is a block diagram of the optical driving mechanism 3, according to another embodiment of the present disclosure. When the optical driving mechanism 3 is powered on, the second movable part 200 moves, and the sensing magnet 3204 moves with the second movable part 200 and causes the change of the magnetic field. Subsequently, the sensing assembly 3000 senses the magnetic field of the sensing magnet 3204. The sensing assembly 3000 transmits a position signal to the control circuit 3500 when the second movable part 200 stops moving. That is, the sensing assembly 3000 may sense the magnetic field of the sensing magnet 3204 when the second movable part 200 moves, and transmit the position signal to the control circuit 3500 after the second movable part 200 stops moving. The control circuit 3500 transmits signals to the first terminal 316a, 316b and the second terminal 326a, 326b respectively according to the position information, then the first terminal 316a, 316b and the second terminal 326a, 326b respectively transmit current to drive the first driving assembly 110 and the second driving assembly 210.

To sum up, the present disclosure provides an optical driving system, the opening of the fixed part is disposed between the two driving assemblies, so that the opening has a higher structural strength, and the separated driving assemblies may prevent their mutual interference. Additionally, the sensing assembly makes the position control more accurate.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. An optical driving mechanism, comprising:
   a first movable part connected to an optical element;
   a fixed part, wherein the first movable part is movable relative to the fixed part;
   a second movable part, wherein the second movable part moves relative to the fixed part;
   a first driving assembly driving the first movable part to move relative to the fixed part;
   a second driving assembly;
   a magnet disposed in the first movable part; and
   a locking element disposed in the fixed part, wherein:
   the fixed part has an opening for the light to pass through;

the opening corresponds to an optical module, wherein the opening and the optical module are aligned on an optical axis where the light passes through;
   when viewed along the optical axis, the opening is between the first driving assembly and the second driving assembly, and the opening does not overlap with the first driving assembly and the second driving assembly; and
   the optical element connects the first movable part and the second movable part;
   the first driving assembly includes a first coil; and
   the distance between the magnet and the first coil is different from the distance between the second movable part and the locking element.

2. The optical driving mechanism as claimed in claim 1, wherein the optical element has an area disposed with a different color than the rest of the optical element.

3. The optical driving mechanism as claimed in claim 1, wherein the opening, the first driving assembly, and the second driving assembly are arranged along a straight line.

4. The optical driving mechanism as claimed in claim 1, wherein the first driving assembly and the second driving assembly are electromagnetic driving assemblies.

5. The optical driving mechanism as claimed in claim 1, wherein the distance between the magnet and the first coil is more than 0.15 mm.

6. The optical driving mechanism as claimed in claim 1, wherein the first driving assembly further includes a first magnetic element corresponding to the first coil, and the first driving assembly is a linear driving assembly.

7. The optical driving mechanism as claimed in claim 6, wherein the second driving assembly is a rotary motor.

8. The optical driving mechanism as claimed in claim 1, wherein the fixed part further comprises:
   a first base accommodating the first movable part and the first driving assembly;
   a second base accommodating the second movable part and the second driving assembly; and
   an outer cap coupled to the first base and the second base.

9. The optical driving mechanism as claimed in claim 8, wherein a bottom surface of the first base and a bottom surface of the second base are on the same surface.

10. The optical driving mechanism as claimed in claim 8, wherein the first driving assembly comprises a magnetic element, and the attraction force between the magnet and the magnetic element causes the first base to contact the first movable part.

11. The optical driving mechanism as claimed in claim 8, wherein the second base is separated from the first base.

12. The optical driving mechanism as claimed in claim 8, wherein:
   the first base comprises two side outer surfaces and a plurality of first terminals that extend to the two side outer surfaces of the first base; and
   the second base comprises two side outer surfaces and a plurality of second terminals that extend to the two side outer surfaces of the second base.

13. The optical driving mechanism as claimed in claim 12, wherein:
   the first terminals are electrically connected to the first driving assembly; and
   the second terminals are electrically connected to the second driving assembly.

14. An optical driving mechanism, comprising:
   a first movable part connected to an optical element;
   a fixed part, wherein the first movable part is movable relative to the fixed part;

a first driving assembly driving the first movable part to move relative to the fixed part;

a second movable part, wherein the second movable part moves relative to the fixed part; and a locking element, disposed in the fixed part, wherein:

the fixed part has an opening; and the distance between the second movable part and the locking element is about 0.05 mm.

15. An optical driving mechanism, comprising:

a first movable part connected to an optical element;

a fixed part, wherein the first movable part is movable relative to the fixed part;

a second movable part, wherein the second movable part moves relative to the fixed part;

a first driving assembly driving the first movable part to move relative to the fixed part; and a second driving assembly; and a sensing assembly, wherein:

the fixed part has an opening for the light to pass through;

the opening corresponds to an optical module, wherein the opening and the optical module are aligned on an optical axis where the light passes through;

when viewed along the optical axis, the opening is between the first driving assembly and the second driving assembly, and the opening does not overlap with the first driving assembly and the second driving assembly; and the optical element connects the first movable part and the second movable part; and the second movable part comprises a sensing magnet, wherein the sensing assembly and the sensing magnet are arranged in the same direction as the direction in which the second movable part moves.

16. The optical driving mechanism as claimed in claim 15, wherein a direction of the magnetic field of the sensing magnet is perpendicular to the plane on which the second movable part moves.

17. The optical driving mechanism as claimed in claim 15, further comprising a control circuit, wherein the sensing assembly transmits a position signal to the control circuit when the second movable part stops moving.

* * * * *